United States Patent [19]

Le Ruyet et al.

[11] 4,086,098

[45] Apr. 25, 1978

[54] COMPOSITION OF MATTER COMPRISING CELLULAR AGGREGATE DISTRIBUTED IN A BINDER

[75] Inventors: Daniel Le Ruyet, Plaisir, France; Daniel De Vos, Charleroi, Belgium

[73] Assignee: BFG Glassgroup, Paris, France

[21] Appl. No.: 740,675

[22] Filed: Nov. 10, 1976

[30] Foreign Application Priority Data

Nov. 14, 1975 United Kingdom ............... 47111/75
Sep. 24, 1976 United Kingdom ............... 47111/76

[51] Int. Cl.² ................................................. C04B 7/02
[52] U.S. Cl. ........................................ 106/97; 106/110; 106/281 R; 260/37 EP; 260/37 N; 260/38; 260/40 R
[58] Field of Search ............... 106/97, 110, 281 R; 260/37 EP, 37 N, 38, 40 R

[56] References Cited

U.S. PATENT DOCUMENTS

| | | | |
|---|---|---|---|
| 3,503,771 | 3/1970 | Kroyer | 106/97 |
| 3,562,370 | 2/1971 | Shannon | 106/97 |
| 3,764,357 | 10/1973 | Bowles et al. | 106/97 |
| 3,804,058 | 4/1974 | Messenger | 106/97 |
| 3,823,021 | 7/1974 | Jansen | 106/97 |
| 4,002,482 | 1/1977 | Coenen | 106/97 |

*Primary Examiner*—J. Poer
*Attorney, Agent, or Firm*—Cushman, Darby & Cushman

[57] ABSTRACT

There is provided a composition of matter comprising a cellular aggregate distributed in a hardenable or hardened binder or matrix material, in which the aggregate consists of or includes (i) a fraction of cellular glass beads of mesh sizes up to 3 mm, individually containing one or more interior cells with a maximum cross-sectional dimension at least 0.3 times the mesh size of the bead and having a non-cellular or micro-cellular surface skin, and (ii) a fraction of cellular glass beads of mesh sizes above 3 mm, individually having a multicellular core with a cell population per unit volume substantially higher than the population of said interior cells in said fine fraction beads and likewise having a non-cellular or micro-cellular surface skin.

32 Claims, 1 Drawing Figure

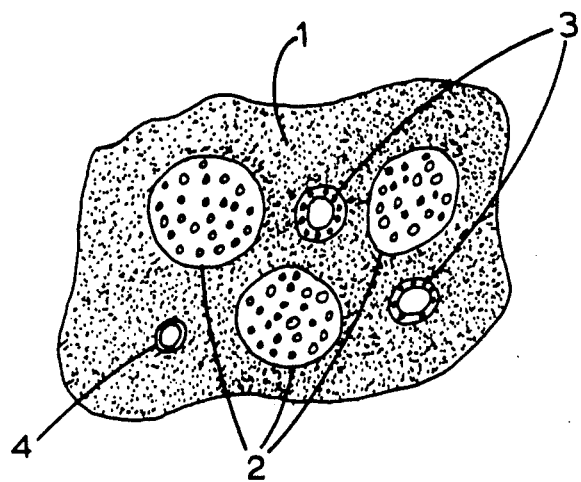

COMPOSITION OF MATTER COMPRISING CELLULAR AGGREGATE DISTRIBUTED IN A BINDER

This invention relates to compositions of matter comprising a cellular aggregate distributed in a hardenable or hardened binder or matrix material.

It is known to use cellular bodies, e.g., bodies of expanded clay, clinker or glass, as an aggregate in mouldable compositions for reducing the weight of products formed therefrom or for modifying their thermally insulating properties.

Problems arise in formulating such compositions to achieve the required combination of properties. This is due in part to a conflict between different demands. For example a problem is involved in achieving light weight products without too great a sacrifice of mechanical strength, and this is particularly so if at the same time it is desired to form moulded products having good thermally insulating properties.

Such problems have been encountered, inter alia, in the production of light-weight concretes.

Due to the incompatibility of various ideal properties a compromise necessarily has to be made.

The object of the present invention is to provide a composition having a favourable combination of properties which is not attainable by known compositions.

According to the present invention there is provided a composition of matter comprising a cellular aggregate distributed in a hardenable or hardened binder or matrix material, characterised in that the aggregate consists of or includes (i) a fraction of cellular glass beads (hereafter called "fine fraction beads") of mesh sizes up to 3mm, individually containing one or more interior cells with a maximum cross-sectional dimension at least 0.3 times the mesh size of the bead and having a non-cellular or micro-cellular surface skin, and (ii) a fraction of cellular glass beads (called "coarse fraction beads") of mesh sizes above 3 mm, individually having a multicellular core with a cell population per unit volume substantially higher than the population of said interior cells in said fine fraction beads and likewise having a non-cellular or micro-cellular surface skin.

It has been found that by employing as an aggregate cellular glass beads of a size range distribution extending above and below 3 mm, and using for the fine and coarse fraction beads which have different structural features as above specified, it is possible to make compositions which in the hardened state have remarkably high strength in relation to their specific gravity and their thermal conductivity. In addition, the fine and coarse fraction beads together confer advantageous sound insulating properties on products formed from the compositions.

It is another advantage of the invention that a good distribution of the glass beads in any required volume of binder or matrix material can be easily achieved. The facility with which the beads can be mixed with a hardenable binder or matrix material is due to their composition and physical form and tends to increase the closer the beads approximate to a truly spherical shape. It is preferable for the glass beads employed in carrying out the invention to be of substantially spherical form but that is not essential. Beads of any rounded form, e.g., ellipsoidal beads, can be used.

In the preferred embodiments of the invention the fine and coarse fraction beads have substantially water-impermeable surface skins. This feature affords the advantage that mouldable compositions, e.g., cement, can be made up without having to reckon with water absorption by the beads, and water will not be trapped in the beads when the product dries. In addition the thermally insulating properties of the product are not likely to be impaired by moisture absorption by the beads. Cellular glass beads can be considered to have substantially water-impermeable skins if the water absorption after immersion of the beads in water for 24 hours is less than 20% by weight.

For any given type of composition, the best volume ratio between the cellular glass beads and the binder or matrix material will depend of course on numerous factors including the properties of the binder or matrix material and the strength, thermal conductivity and other properties of the product to be formed.

Preferably the coarse fraction beads cover a size range extending up to at least 8 mm. Generally speaking it is preferred not to use beads above 30 mm in size and in most cases it is advisable to observe a maximum size much below 30 mm. The use of coarse fraction beads up to at least 8 mm in size promotes a very favourable strength/density ratio for products formed from the composition. In certain compositions according to the invention the said coarse fraction beads cover a size range extending up to at least 16 mm.

The fine fraction beads may and preferably do cover a size range extending substantially below 3 mm. For a given weight of fine beads, a reduction in their size tends to result in a reduction in the thermal conductivity of the product and makes it easier uniformly to distribute a substantial proportion of such beads in the composition. Taking these considerations into account, certain compositions according to the invention contain fine fraction beads which cover a size range extending down to below 1 mm in size.

The fine fraction beads preferably have a bulk density of not more than 350 kg/m$^3$. The observance of this condition makes it easier to make up compositions having a low thermal conductivity and a reasonably high compression resistance. In certain compositions according to the invention the said fine fraction beads have a bulk density between 250 and 350 kg/m$^3$.

The coarse fraction beads preferably have a bulk density lower than the fine fraction beads. In certain compositions according to the invention the coarse fraction beads have a bulk density of not more than 200 kg/m$^3$ and most preferably a bulk density between 80 and 200 kg/m$^3$. The use of coarse fraction beads in such categories is conducive to achieving products of low density.

The binder or matrix material is preferably cement, e.g., Portland cement. It is in this field that the invention affords the most important advantages. The need for concretes which combine lightness of weight with good mechanical strength and low thermal conductivity has stimulated considerable research in recent years and the invention makes an important contribution in this field. In particular, concretes incorporating fine and coarse cellular glass beads with the characteristics required according to the present invention can be formed into monolithic structures combining load-bearing and thermally insulating properties. Such concretes can be used, for example, for forming walls, floors, flat roofs, cladding layers, blocks and other prefabricated components for structural or other purposes.

Reference has already been made herein to preferred values for the size range covered by the cellular glass beads. The values which have been given are applicable to compositions containing various kinds of binder or matrix material. Experiments have shown that when applying the invention to the production of light weight concrete, i.e., when using cement as the binder or matrix material, the most useful results can be achieved when adopting one or more of the following conditions (a) to (f):

(a) the volume of the combined fine and coarse fractions of beads is at least 50% of the dry volume of the composition;

(b) the coarse fraction beads are wholly or predominantly in the size range 8 to 16 mm;

(c) the coarse fraction beads are classifiable into two sub-fractions respectively containing beads above and below 8 mm in size and the bulk volume of the 3 to 8 mm sub-fraction beads is less than the bulk volume of the beads of the other of said sub-fractions but greater than the bulk volume of the fine fraction beads;

(d) the ratio between the bulk volumes of the coarse fraction beads and the fine fraction beads is between 6:1 and 1:1;

(e) the proportions by volume of the fine and coarse fractions of beads in the composition is such that the dry composition has a thermal conductivity below 0.25 kcal/mh° C;

(f) the proportions by volumes of the fine and coarse fractions in the composition and their size distribution are such that the dry composition 28 days after setting has a density below 950 kg/m$^3$ and a compression resistance of more than 60 kg/cm$^2$ (preferably 70 to 120 kg/cm$^2$).

Compositions according to the invention (not only those wherein cement is used as binder or matrix material) may incorporate one or more other aggregate components additional to the specified fine and coarse fractions of cellular glass beads. For example the aggregate may incorporate other cellular glass beads which do not fall in the specified categories. As another example, in a light-weight concrete the aggregate may incorporate sand in addition to the specified fine and coarse fractions of cellular glass beads. The presence of sand tends to increase the compression resistance of the concrete when set and is therefore a useful addition in cases where very high compression resistance is required and the maximum permissible product density is not very low.

The invention can be employed in the formation of compositions comprising synthetic polymeric material as binder or matrix material. By applying the invention compositions can be prepared which combine to a very advantageous degree, good mechanical strength with good thermally insulating and sound insulating properties. Such compositions are very useful, e.g., in making prefabricated panels or other components for use in buildings or other structures or for application to form insulating layers or coatings in situ.

Suitable synthetic polymeric materials for use as binder material include thermoplastic and thermosetting resins. Examples of particularly satisfactory binder or matrix materials are polyurethane (e.g., reaction product of toluene diisocyanate and hydroxyl terminated propylene adipate), and phenolic (e.g., phenol-formaldehyde), epoxy (e.g., bisphenol A-epichlorhydrin) and polyester (e.g., styrene modified ethylene glycol-diethylene glycol-maleate-phthalate) resins. Other suitable binder or matrix materials include plaster and bitumens.

The glass beads can be beads of natural glass, for example obsidian, basalt, rhyolite or perlite. Preferably however the glass beads are made of manufactured glass, e.g., soda-lime glass or sodium borosilicate glass.

Compositions according to the invention can be set in a mould or trowelled or otherwise spread, e.g., as is done in conventional plastering or when using concrete to form concrete floors or other structures in situ.

PREPARATION OF FINE FRACTION BEADS

Beads having the characteristics required for the fine fraction beads can be produced, for example, by spraying-drying a feedstock comprising a liquid medium containing glass particles, and if necessary a cellulating agent, thereby to form "green" beads in which glass particles are held together by the binder and which contain a cellulating agent or gas derived therefrom, and then firing such green beads to transform them into cellular glass beads. In such a method the size and form of the fired beads are related to the size and form of the green beads resulting from the spray-drying step and can be predetermined within close limits. When preparing cellular glass beads by such a method it is recommended to make up the feedstock, i.e., the slip containing the glass particles, to viscosity within the range 200 to 10,000 cps. The liquid medium is preferably water in a proportion of less than 50%, most preferably 20 to 40% by weight based on the total weight of the slip. In the spray-drying step sufficient evaporation of water from the individual drops can then occur in very short heating periods. It is very satisfactory for the glass particles in the slip to be particles of crushed glass in the size range 10 to 250 microns, but this is not critical. The binder may be dissolved in the continuous liquid phase of the medium or in a liquid disperse phase and is preferably a substance which becomes chemically integrated with the glass during the firing of the green beads to glass-forming temperature. Sodium silicate is a particularly satisfactory binder. Other categories of binder which can be used include synthetic polymeric substances, e.g., phenolic (e.g., phenol-formaldehyde) and epoxy (e.g., bisphenol A-epichlorhydrin) resins, polyester (e.g., propylene glycol-adipate-maleate modified by styrene) and polyamides (e.g. a copolymer of hexamethylnediamine-adipic acid and hexamethylenediamine-sebacic acid). The cellulating agent may be a gaseous substance or a substance or combination of substances which give rise to the evolution of gas causing cellulation during the spray-drying step or during subsequent firing of the green beads. Examples of suitable cellulating agents are carbonates, e.g., sodium bicarbonate, calcium carbonate, nitrates, e.g., sodium nitrate, urea, and combustible substances such as carbon and sawdust. In most cases the vapourisation of the liquid vehicle of the initial slip will give rise to some cellulating effect and it is possible to rely upon this vehicle as sole cellulating agent. If the binder is suitably selected, cellulation can be brought about by evolution of gas from the binder.

The following is an example of such a method of preparing beads suitable for forming the fine fraction or part of the fine fraction of the aggregate of a composition according the invention:

BEAD PREPARATION METHOD 1 (FINE FRACTION):

An aqueous solution of sodium silicate (38° Baume) was mixed with powdered urea and glass particles in the size range 20-100 microns. The glass particles were particles of an ordinary soda-lime glass having the following composition in percentages by weight: 70.4% $SiO_2$, 12.78% $Na_2O$, 12.14% CaO, 1.77% MgO, 1.92% $Al_2O_3$, the remainder being impurities. 10.5 liters of sodium silicate solution were used per 20 kg of the glass. The amount of urea was equal to 2% by weight based on the weight of the glass. Further water was added to adjust the viscosity of the slip to substantially 3000 cps. With the aid of compressed air this slip was sprayed into a drying column containing an ascending stream of hot combustion gases coming from a glass firing furnace, and having on entry into such column a temperature in the range of 200° to 400° C. The drops leaving the spray head were of various sizes in the range of 100 to 1000 microns. In the drying column the drops were carried upwardly by the ascending hot gases and water evaporated from the drops so that they became converted into self sustaining beads individually containing glass particles held together by sodium silicate as binder. At the same time some decomposition of the urea took place with the evolution of gases so that some expansion of the green beads took place. These beads discharged continuously from the top of the drying column and were collected preparatory to their delivery to the glass firing furnace which was maintained at an operating temperature in the range of 800° to 1200° C. In this furnace the green beads were carried upwardly by ascending hot gases and the glass grains in the individual green beads softened and sodium silicate became chemically integrated with the glass. The beads expanded due to further decomposition of the urea and increase of gas pressure within the beads. The green beads fed into the furnace were thus converted into cellular glass beads. These beads were discharged from the top of the furnace and then cooled in a gas stream to below the softening range of the glass before the beads were allowed to come together in bulk. The cooled cellular glass beads were of more or less spherical form and of sizes distributed over the range 150 microns to 2.5 millimeters. The beads were of cellular form and had a bulk density of the order of 250 kg/m³. Most of the beads at the lower end of the size range contained a single large cell, the glass being confined to a thin surface skin. Most of the beads at the upper end of the said size range contained a plurality of large cells. All of the beads had substantially water-impermeable surface skins. The surface skins of most of the beads at the upper end of the size range contained micro-cells. The presence of microcells were less in evidence in the surface skins of the smaller beads. The small hollow beads containing a single large cell and those larger beads which contained a plurality of cells of which at least one had a maximum dimension at least one third of the mesh size of the bead could together be used as the fine fraction beads of a composition according to the invention. By increasing the amount of cellulating agent and/or by increasing the firing temperature above the values given above, the average cell sizes in the larger beads could be increased.

PREPARATION OF COARSE FRACTION BEADS

Beads having the characteristics required for the coarse fraction beads can be produced, for example, by forming nodules of an aqueous pasty medium comprising glass particles and a cellulating agent and subjecting such nodules to heating and subsequent annealing stages. Provided the ingredients of the mixture and the heating and cooling schedule are appropriate, the nodules become converted to beads of the required structure. The mixture should contain only a small proportion of cellulating agent, preferably less than 5% by weight based on the weight of the glass. During the heating the glass particles cohere and then coalesce, starting at the surface of the nodules. Surface to surface cohesion of such glass particles should occur before evolution of gas from the cellulating agent. The nodules must be heated sufficiently to allow expansion of the embryonic beads to take place under the gas pressure but not to such an extent that such beads collapse or that all of the molten glass becomes displaced outwardly to the periphery of the beads.

The following is an example of a method of preparing beads suitable for forming the coarse fraction or part of the coarse fraction of the aggregate of a composition according to the invention:

BEAD PREPARATION METHOD 2 (COARSE FRACTION)

Crushed soda-lime glass with a mean grain size of 6 microns and a specific surface of 3500 cm²/g was mixed with crushed limestone having a mean grain size of 4 microns in an amount of 2.25% based on the weight of the glass, plus water in a quantity of approximately 10% by weight based on the aggregate weight of the glass and limestone.

The mixture was thoroughly mixed to form a paste on a tray or disc from which nodules of the paste were discharged and gently distributed as a single nodule layer on a metal screen belt by which the nodules of approximately 5 to 10 mm in size were transported through a tunnel furnace maintained at a temperature of 600° to 650° C. The nodules remained in the furnace for about 13 minutes. During an initial period of about 10 minutes the nodules became dried and by that time the nodules had been brought to the furnace temperature. The nodules accordingly remained at that temperature for about 2 to 3 minutes. This was sufficient to cause the glass particles in superficial surface layers of the individual nodules to become sintered together. The quality of this surface sintering is important because it has an important influence on the properties of the final product.

These surface-sintered nodules were fed into a rotary drum furnace maintained at a temperature of 800° C. The nodules remained in this furnace for between 3 and 4 minutes. During this period of time the continuous rotation of the drum kept the nodules in mutual rolling contact. The glass particles softened and the limestone decomposed with evolution of $CO_2$, causing cellulation. The nodules became converted to cellular glass beads in sizes approximately double the sizes of the initial nodules, the beads being characterised by a foamed core structure and an enveloping skin which was non-cellular or only slightly cellulated. These beads were deposited on a metal belt conveyor by which they were transported through an annealing tunnel in which the beads were reduced to annealing temperature (about 500° C) and were kept at that temperature for 10 to 15 minutes. The beads were subsequently rapidly cooled to ambient temperature. The formed beads had a bulk density of between 0.12 and 0.18 g/cm³.

The beads had a very low water permeability as is evident from that fact that after immersion in water at room temperature for a period of 24 hours the beads were found to have absorbed less than 7% by volume of water. The water absorption after exposure of the beads for 24 hours in an atmosphere of 99% relative humidity at 20° C was less than 0.25% by weight.

The water absorption tends to be lower for beads having a bulk density at the upper end of the aforesaid bulk density range and can be as low as 3% by volume and less than 0.1% by weight respectively under the specified conditions.

The beads had a crushing strength in excess of 15 kg/cm² even for the beads having the lowest bulk density.

The manufacture of compositions according to the invention requires merely the thorough mixing of the aggregate with the selected binder or matrix material and water or other liquid vehicle (if required). When making a light weight concrete, it is preferred to mix the cement and the cellulated glass beads dry and then to add water and continue mixing until the beads are perfectly enveloped. As an alternative the beads could be added to previously prepared mortar.

A part of a structure formed of a particular composition according to the invention, selected by way of example, is represented in the accompanying diagrammatic drawing which will now be referred to.

The composition forming the structure comprises a cement matrix or binder 1 in which is distributed a coarse fraction of glass beads such as 2 (above 3 mm in size) and a fine fraction of glass beads such as 3 and 4 which are below 3 mm in size. The coarse fraction beads 2 have a multicellular core enveloped by a substantially water-impermeable. The fine fraction beads 3 are hollow beads comprising a shell which is of microcellular structure and is also substantially water-impermeable. The fine fraction beads 4, which are of smaller size than the fine fraction beads 3, are hollow beads having a substantially non-cellular surface skin which is likewise substantially water-impermeable. In the drawing, in order to clarify the illustration, the beads of the different fractions have not been drawn to the same scale.

The present invention also includes, any and all compositions within the following definition: A light weight mouldable composition, e.g., concrete of plain structure, formed from a binder, water (optional) and coarse and fine aggregates, characterised in that the fine aggregates have a granulometry from just above 0 to 3 (or 4) mm, these aggregates being composed, at least in part, of granules of an expanded product, the granules having very small water absorbency and an apparent volume mass of not more than 350 kg/m³, and in that the coarse aggregates have a granulometry between 3 and 30 mm, these aggregates being composed, at least in part, of granules of an expanded product, the granules having small water absorbency and an apparent volume mass of not more than 200 kg/m³. In addition to having such characteristics, the moulded composition is preferably characterised in that the apparent volume mass of the fine aggregates decreases as the diameter of the aggregates increases. The present invention also includes mouldable compositions (e.g., compositions in which cement is present as binder, together with water) for moulding into a moulded composition as hereinbefore defined.

Certain specific embodiments of the invention will now be described by way of example.

EXAMPLE 1 to 4

The following Table I gives the compositions of four different light-weight concrete mixes according to the invention:

Table I

| Ingredients of composition | Example Nos: | | | |
|---|---|---|---|---|
| | 1 | 2 | 3 | 4 |
| Cellular glass beads (bulk volume in liters): | | | | |
| 0–3 mm | 200 | 450 | 350 | 200 |
| 3–8 mm | 350 | — | — | — |
| 8–16 mm | 700 | 800 | 900 | 1070 |
| Water (in liters): | | | | |
| Theoretical amount (water/cement ratio = 0.4) | 120 | 140 | 160 | 140 |
| Amount in practice (water/cement ratio = 0.45) | 135 | 157 | 180 | 157 |
| Artificial Portland cement 400 (in kg) | 300 | 350 | 400 | 350 |
| River sand (in kg) | — | — | — | 255 |
| Properties of the product: | | | | |
| Density of the freshly dried composition (kg/m³) | 639 | 692 | 793 | 962 |
| Density of dried composition after 28 days (kg/m³) | 630 | 680 | 782 | 948 |
| Compression resistance after 28 days (kg/cm²) | 61 | 72 | 85 | 105 |
| Thermal conductivity (kcal/m/h/° C) | 0.12 | 0.15 | 0.17 | 0.22 |
| Compatibility with cement (tested according to ASTM C 227.71) | excellent | | excellent | |

In the above four compositions the cellular glass beads of the fine aggregate fraction (0–3 mm) and of the coarse aggregate fraction (3–16 mm) had the structures required for such fractions by the present invention. All of such beads asorbed less than 6% by weight of water during 24 hours immersion in water. The beads of the size range 0–3 mm were produced by a method of preparation of fine beads as herein described. They had a bulk density of 250 kg/m³. The beads of the size range 3–8 mm, which had a bulk density of 160 kg/m³, and the beads of the size range 8–16 mm, which had a bulk density of 140 kg/m³, were produced by methods of preparation of coarse fraction beads as herein described.

Light weight concretes formed from compositions according to the above Examples 1 to 4 show very small shrinkage (little greater than ordinary concrete). They are incombustible and remarkably resistance to high temperatures. For example, on heating to 500° C the crushing strength of such light-weight concretes decreases by no more than 10%. The corresponding value for ordinary concretes is 60 to 70%.

Light weight concretes according to the invention afford excellent thermal insulation. The following Table II illustrates this advantage by comparing a light weight concrete according to the foregoing Example I with other concretes of conventional types. For each concrete the table gives the total wall thickness necessary for obtaining a thermal transfer coefficient of a wall, equal to 0.60 kcal/m²/h/° C.

Table II

| Material | Density (in kg/m³) | Total wall thickness (in cm) |
|---|---|---|
| Conventional concrete | 2,200[1] | 23 cm[2] |
| Expanded clay concrete | 1,300 | 86 cm |

Table II-continued

| Material | Density (in kg/m³) | Total wall thickness (in cm) |
|---|---|---|
| Autoclaved cellular concrete[3] | 650 | 22 cm |
| Light-weight concrete according to Example 1 | 650 | 17 cm |

[1] apparent volume mass of the concrete alone
[2] comprising two layers of concrete 10 cm and 8 cm in thickness with an intervening 5 cm space filled with an insulator
[3] cellular concrete commercially available under the Trademark SIPROREX, YTONG or DYROX The composition can comprise, consist essentially of or consist of the materials set forth.

In addition to Portland cement, there can also be employed as the binder other cements, e.g., other hydraulic cements or gypsum cements (plaster).

What is claimed is:

1. A composition of matter comprising a cellular aggregate distributed in a hardenable or hardened binder or matrix material, characterised in that the aggregate comprises (1) a fine fraction of cellular glass beads of mesh sizes up to 3 mm, individually containing one or more interior cells with a maximum cross-sectional dimension at least 0.3 times the mesh size of the bead and having a non-cellular or micro-cellular surface skin, and (2) a fraction of coarse cellular glass beads of mesh sizes above 3 mm, individually having a multicellular core with a cell population per unit volume substantially higher than the population of said interior cells in said fine fraction beads and likewise having a non-cellular or micro-cellular surface skin, the ratio between the bulk volumes of the coarse fraction beads and the fine fraction beads being between 6:1 and 1:1, the volume of the combined fine and coarse fractions of beads being at least 50% of the dry volume of the composition.

2. A light-weight moulded composition, formed from a binder, and coarse and fine aggregates, characterised in that the fine aggregates have a granulometry between 0 and 4 mm, these aggregates being composed, at least in part, of granules of an expanded glass product, the granules having very small water absorbency and an apparent volume mass of not more than 350 kg/m³, and in that the coarse aggregates have a granulometry between 3 and 30 mm, these coarse aggregates being composed, at least in part, of granules of an expanded product, the granules having small water absorbency and an apparent volume mass of not more than 200 kg/m³, the ratio between the bulk volumes of the coarse fraction beads and the fine fraction beads being between 6:1 and 1:1, the volume of the combined fine and coarse fractions of beads being at least 50% of the dry volume of the composition.

3. A composition according to claim 1 wherein the fine and coarse fraction beads both have substantially water-impermeable surface skins.

4. A composition according to claim 3 wherein the said coarse fraction beads cover a size range extending up to at least 8 mm.

5. A composition according to claim 4 wherein the said coarse fraction beads cover a size range extending up to at least 16 mm.

6. A composition according to claim 4 wherein the fine fraction beads cover a size range extending down to below 1 mm.

7. A composition according to claim 6 characterized in that the fine fraction beads have a bulk density of not more than 350 kg/m³ and the coarse fraction beads have a bulk density of not more than 200 kg/m³.

8. A composition according to claim 7 wherein the fine fraction beads have a bulk density between 250 and 350 kg/m³ and the coarse fraction beads have a bulk density between 80 and 200 kg/m³.

9. A composition according to claim 1 wherein the binder or matrix material is Portland cement.

10. A composition according to claim 9 wherein the coarse fraction beads are wholly or predominantly in the size range 8 to 16 mm.

11. A composition according to claim 10 wherein the coarse fraction beads are classifiable into two sub-fractions, sub-fraction (a) containing beads above 8 mm and sub-fraction (b) containing beads 3 and 8 mm in size, the bulk volume of the sub-fraction (b) beads being less than the bulk volume of the beads of sub-fraction (a) but greater than the bulk volume of the fine fraction beads.

12. A composition according to claim 1 wherein the proportions by volumes of said fine and coarse fractions of beads in the composition is such that the dry composition has a thermal conductivity below 0.25 kcal/mh° C.

13. A composition according to claim 1 wherein the proportions by volumes of said fine and coarse fractions in the composition and their size distribution are such that the dry composition 28 days after setting has a density below 950 kg/m³ and a compression resistance of more than 60 kg/cm².

14. A composition according to claim 9 wherein the cement also contains sand.

15. A composition according to claim 1 wherein the binder or matrix material comprises a synthetic polymer.

16. A composition according to claim 15 wherein the binder or matrix material comprises a polyurethane, a phenol-aldehyde, epoxy or polyester resin.

17. A light-weight composition according to claim 2 wherein the apparent volume mass of the aggregates decreases as the diameter of the aggregates increases.

18. A light-weight composition according to claim 17 wherein the volume mass of the fine aggregates is between 80 and 250 kg/m³.

19. A light-weight composition according to claim 17 wherein the volume mass of the coarse aggregates is between 80 and 200 kg/m³ and is lower than that of the fine aggregates.

20. A composition according to claim 19 wherein the coarse aggregates have a granulometry between 3 and 16 mm.

21. A composition according to claim 20 wherein the expanded product is at least partially in vitrified state.

22. A composition according to claim 21 wherein the granules are mono or multi-cellular granules with closed pores.

23. A composition according to claim 22 wherein the granules are of substantially spherical or ellipsoidal form.

24. A composition according to claim 22 wherein the binder is Portland cement.

25. A composition according to claim 22 wherein the binder is plaster, bitumen, a rigid or alveolate thermoplastic resin, or a thermosetting resin.

26. A composition according to claim 22 wherein the expanded product is, at least in part, expanded obsidian, expanded basalt, expanded rhyolite, expanded perlite, expanded slag or clinker.

27. A composition according to claim 22 wherein it has a volume mass, at the end of 28 days, below 950 kg/m$^3$, a thermal conductivity below 0.25 kcal/h/m/° C and a compressiion resistance, at the end of 28 days, above 60 kg/cm$^2$.

28. A composition according to claim 27 wherein it has a compression resistance, at the end of 28 days of the order of 70 to 120 kg/cm$^2$.

29. A composition according to claim 1 wherein the binder or matrix comprises Portland cement, gypsum, a thermoplastic resin, a thermosetting resin or bitumen.

30. A composition according to claim 29 wherein the fine and coarse fraction beads both have substantially water-impermeable surfaces.

31. A composition according to claim 30 wherein the binder or matrix is hardenable and the composition comprises Portland cement and water.

32. A composition according to claim 30 wherein the binder or matrix is in the hardened state.

* * * * *